United States Patent [19]

Schwartz

[11] 3,968,539

[45] July 13, 1976

[54] ADJUSTABLE HANDLE FOR AN INSTRUMENT CASING

[75] Inventor: Edwin L. Schwartz, Los Angeles, Calif.

[73] Assignee: Rite Autotronics Corporation, Los Angeles, Calif.

[22] Filed: Oct. 10, 1975

[21] Appl. No.: 621,482

[52] U.S. Cl. .................................. 16/115; 73/431; 220/96; 224/45 R
[51] Int. Cl.² .................... A47B 95/02; B65D 25/28
[58] Field of Search ........... 73/431; 224/45 R, 29 B, 224/46 R; 16/115, 110 R; 354/293; 220/96

[56] References Cited
UNITED STATES PATENTS

| | | | |
|---|---|---|---|
| 2,841,814 | 7/1958 | Murphy | 16/110 R |
| 3,513,952 | 8/1970 | Warner, Jr. | 16/115 X |
| 3,733,086 | 5/1973 | Walkcrow | 224/29 B |
| 3,808,634 | 5/1974 | Szabo | 16/115 |
| 3,878,964 | 4/1975 | Fogle | 224/46 R X |

Primary Examiner—Richard C. Queisser
Assistant Examiner—Daniel M. Yasich
Attorney, Agent, or Firm—Robert E. Geauque

[57] ABSTRACT

A handle for an instrument casing or other device, which handle is rotatably mounted by an extension handle section to the instrument casing so that the handle can be moved from a completely retracted position to a fully extended position, the handle having a detent mechanism consisting of a roller extending across the surface of said handle extension section and supported by a spring wire passing through the roller and supported at position spaced from the end of the roller to cause said roller to roll from one detent depression to another in the extension surface, the bearing supports on the extension section of said handle being hollow to permit leads to pass through the handle into the instrument casing.

8 Claims, 10 Drawing Figures

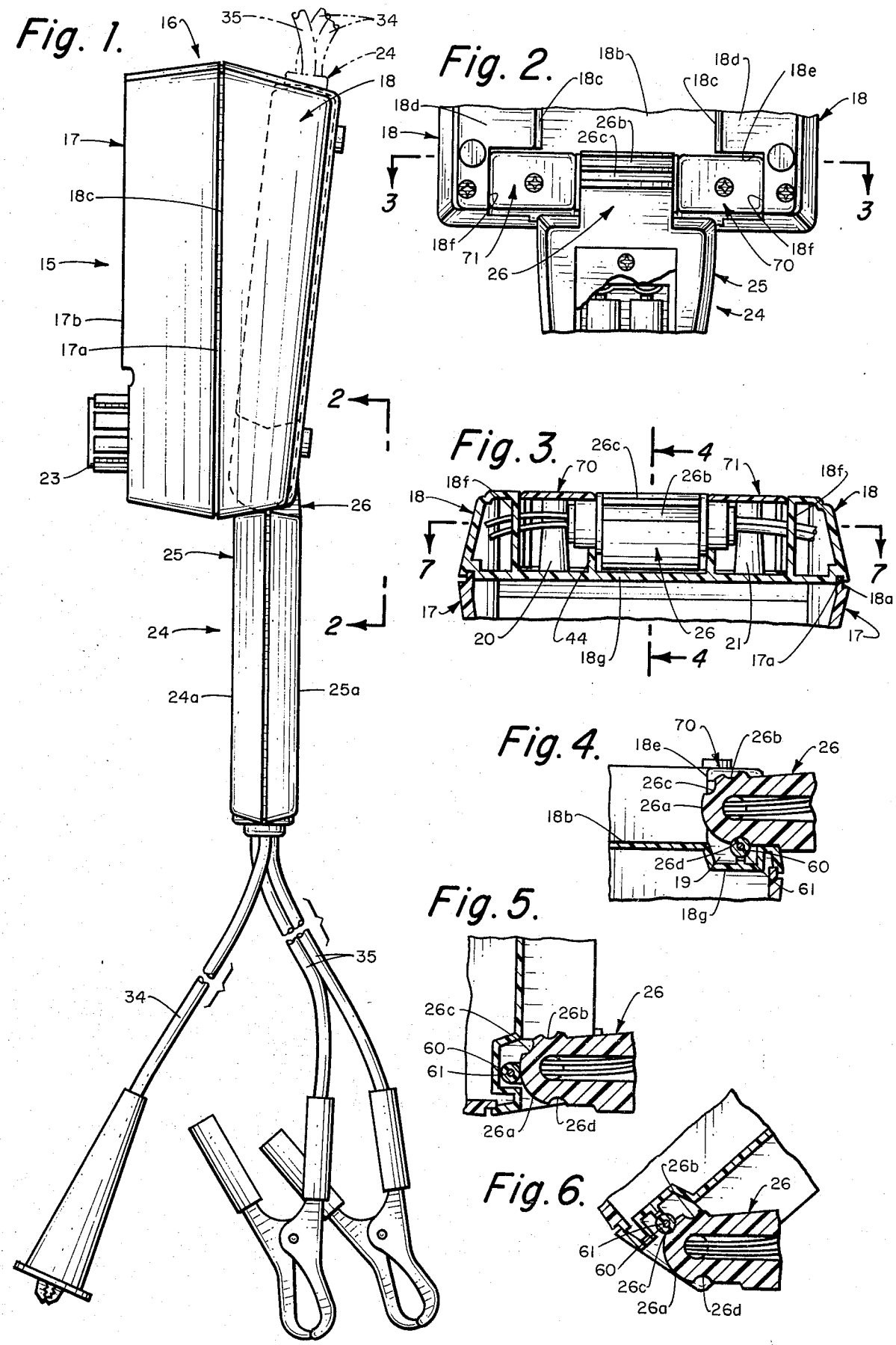

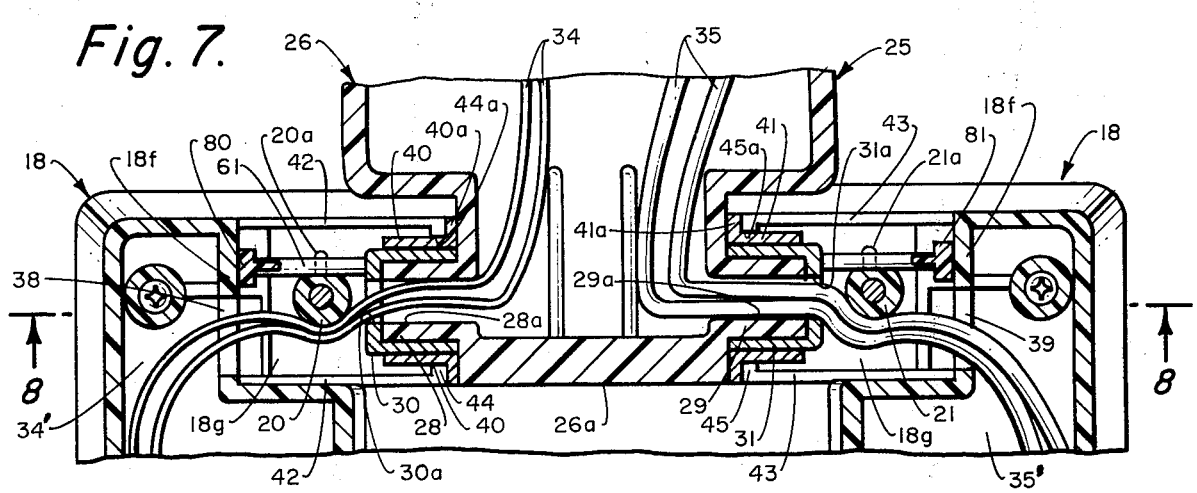

ADJUSTABLE HANDLE FOR AN INSTRUMENT CASING

BACKGROUND OF THE INVENTION

Numerous test instruments are utilized to maintain and adjust the internal combustion engine of an automobile. In many cases, the inputs to these instruments are connected directly to parts of the engine and the instrument is observed while the engine is stopped or running. Therefore, it is necessary that the instrument be placed in a location that the mechanic can observe both the instrument and the engine while the hood of the engine is in open position. Previously, it has been necessary to lay the instrument on the adjacent fender of the car or to prop it up within the engine compartment in some manner. It is apparent in many cases that the instrument is not firmly supported and that the instrument can be easily knocked off of its support and thereby damaged. Also, the only locations available for the instrument makes it very difficult for the mechanic to see the instrument. Further, the leads going to the test equipment from the engine make it awkward to locate and maintain the instrument in a desirable position.

SUMMARY OF THE INVENTION

The invention provides an adjustable handle for an instrument casing which can be moved from a retracted position, in which the instrument can be flat on its back, to a position extending below the instrument, where it can be gripped by the hand of the operator. In the fully extended position, the handle can be hand gripped by the mechanic so that the face of the instrument can be held vertically for observation by the mechanic. When the handle is in the partially extended position, it provides a back support which holds the instrument at an angle for observation and when the handle is fully retracted, the instrument can be laid flat on its bottom as with prior devices. The leads for the instrument pass through the handle and through the bearings supporting the handle on the instrument so that the leads are never in the way of the operator when the handle is gripped by the operator.

A detent mechanism holds the handle in the various positions and consists of a roller supported by a long flexible metal wire extending through the roller. The opposite ends of the wire are attached to the casing and the wire is also supported intermediate its ends to obtain the desired spring force from the wire. The roller engages in curved detent surface in the extension section of the handle and rotation of the handle causes the roller to move from one detent surface to another by rolling over the extension surface. Two cap pieces are secured at opposite sides of the handle extension to provide bearing supports for the handle and these supports have openings for leads which pass from the inside of the handle into the casing. The adjustable handle makes the instrument much more convenient to use since any one of several instrument attitudes can be utilized, as determined by the available surface in the location where the instrument is to be observed.

BRIEF DESCRIPTION OF THE DRAWINGS

FIG. 1 is a side elevational view of the adjustable handle and test instrument showing the handle in fully extended position to be gripped by the hand and showing the leads entering the outer end of the handle, the fully retracted position of the handle being shown in phantom lines;

FIG. 2 is a partial bottom plan view along line 2—2 of FIG. 1 with the cover caps on opposite sides of the extension section of the handle;

FIG. 3 is a vertical section along line 3—3 of FIG. 2 illustrating the bearing sleeves for rotatably mounting the handle;

FIG. 4 is a vertical section along line 4—4 of FIG. 3 illustrating the detent roller and the curved dtent surfaces in the handle extension, the roller being positioned in the detent surface corresponding to the fully extended position of the handle;

FIG. 5 is a section similar to FIG. 4 showing the position of the detent roller when the handle is being rotated from one detent curved surface to another;

FIG. 6 is a section similar to FIG. 4 showing the roller in the detent surface which positions the handle at an angle to the casing;

FIG. 7 is a horizontal section along line 7—7 of FIG. 3 illustrating the supports for the handle and wire spring and showing the leads passing from the interior of the hnalde into the casing;

FIG. 8 is a vertical section along line 8—8 of FIG. 7 illustrating the detent roller and the secured ends of the wire spring;

FIG. 9 is a vertical section along line 9—9 of FIG. 8 illustrating the extension arms on the caps for securing the ends of the wire spring; and FIG. 10 is a vertical section along line 10—10 of FIG. 8 showing a bearing support wall and the wire spring passing through a slot therein.

BRIEF DESCRIPTION OF THE PREFERRED EMBODIMENT

Referring to FIG. 1, the instrument 15 consists of a casing 16 having an upper section 17 and a lower section 18. The lower section 18 contains a groove 18a around its edge which receives projection 17a on section 17 in order to attach the two casing sections together. The casing section 18 comprises a floor 18b and sidewalls 18c extending outwardly from the floor 18b and connecting with bottom section 18d. The end portion of each section 18d is cut away by sides 18e and 18f which extend above floor 18b, and a lower bottom wall 18g extends downward from floor 18b and between the sides 18f to form a bottom expanded space 19 at the end of floor 18b (see FIG. 4). Posts 20 and 21 extend from bottom wall 18g up into space 19.

The depressed space above floor 18b and between sidewall 18c receives handle 24 when in its fully retracted position as illustrated in the phantom line position of FIG. 1. Handle 24 comprises a grip section 25 and an extension section 26 which contains the axis about which the handle rotates. In the stored position, side 25a of grip section 25 is in the same plane as bottom section 18d. The inside of casing section 17 and the spaces 34 and 35 of casing section 18 below section 18d contain the electrical wiring and circuitry for the meter. The face 17b of casing section 17 displays the meter scale and dial indicator (not shown) and various control knobs 23 are located on the face 17b for selecting various measuring circuits for the instrument 15.

The axis of extension section 26 of the handle has hollow bearing projections 28 and 29 (see FIG. 7) extending from opposite sides thereof into expanded space 19 and these projections are covered by fixed metal bearing cylinders 30 and 31, respectively. The bearing cylinders 30 and 31 have end openings 30a and 31a, respectively, which are in alignment with openings 28a and 29a in projections 28 and 29, respectively. Leads 34 pass through handle 24, projection 28 and through opening 38 in one side 18f in order to enter casing space 34. Also, leads 35 extend through the handle 24, projection 29 and opening 39 in the other side 18f in order to enter casing space 35. Since the leads pass through the bearing projections 28 and 29 at the axis of rotation of the handle, the handle can be freely rotated without interferences from the leads.

Bearing sleeves 40 and 41 surround bearing cylinders 30 and 31, respectively, and the cylinders can rotate in the bearing sleeves when the sleeves are fixed to the casing, as will be described. In order to support the bearing sleeves 40 and 41, a pair of upright walls 44 and 45 project upwardly in space 19 from bottom wall 18g and are supported by pairs of wall sections 42 and 43, respectively, extending outwardly from space 19. Wall 44 has a curved cutout surface 44a which receives the lower part of bearing sleeve 40 (See FIG. 10). In a similar manner, wall 45 has a curved cutout surface 45a which recieves the lower part of bearing sleeve 41. Flanges 40a and 41a on sleeves 40 and 41, respectively, are retained adjacent the surface of handle extension 26 by walls 44 and 45, respectively, in order to hold the sleeves in place.

A detent mechanism consists of a detent roller 60 located between walls 44 and 45 and a spring steel wire 61 which passes through an opening in the axis of the roller and through slots 44b and 45b in the walls 44 and 45, respectively. The wire passes below the bearing sleeves 40 and 41 which are supported in the cutouts 44a and 45a in the walls 44 and 45 and the roller is maintained in position on the wire between walls 44 and 45. An enlargement 64 extends from one side 18f into space 19 and has a curved top surface 64a which receives one end 61a of spring wire 61. Another enlargement 65 extends from the other side 18f into space 19 and has a curved surface 65a which receives opposite end 61b of wire 61. The wire 61 is free to move in the cutouts 44a and 45a when it is flexed.

In order to provide clamping of the bearing sleeves 40 and 41 and of the ends 61a and 61b of the wire 61, cover caps 70 and 71 are located over the bearing sleeves and have extensions 70a and 71a which abut the studs 20 and 21, respectively, and are secured thereto by screws 72. Cap 70 has an end wall 74 with a circular cutout surface 74a (see FIG. 10) which receives the upper portion of the bearing sleeve 40 and holds the bearing sleeve between the cutouts 74a and 44a. In a similar manner, the end cap 71 has a wall 76 with a circular cutout 76a which engages bearing sleeve 41 and holds the sleeve 41 against the cutout surfaces 76a and 45a. Thus, the caps 70 and 71 serve to rigidly secure the bearing sleeves 40 and 41 in the casing section 18 while permitting the handle 24 to rotate after screws 72 are tightened.

In addition, cap 70 has a downwardly T-shaped arm 80 having a curved surface 80a at its end and this surface engages the upper portion of wire end 61 to hold it firmly in place after the cap 70 is attached. In a similar manner, the cap 71 has a T-shaped arm 81 having a curved end surface 81a which engages the end 61b of wire 61 and secures it in place. The arm 61 passes to one side of posts 20 and 21 (as illustrated in FIG. 7), and the posts have extension supports 20a and 21a upon which rest ends 61a and 61b, respectively of wire 61 so that only the wire portion between the two extension can flex.

Flat, curved surface 26a of handle section 26 contains detent depression in the form of three detent curved surfaces 26b, 26c and 26d (see FIGS. 4–6). Each of these surfaces snugly receive the roller 60 by rotation of the handle and during rotation between curved surfaces, the roller is pushed outwardly and rolls on flat end surface 26a until the next curved surface is reached and entered (see FIG. 5). The curved surface 26d receives the roller 60 when the handle is in the fully extended position as illustrated in FIG. 1. When the handle is extended at approximately 45° to the instrument casing, the roller is received in circular surface 26c (see FIG. 6) and when the handle is fully retracted into the space between side wall 18c, (see phantom position of FIG. 1), the roller is in the curved surface 26b. When the roller 60 is in a curved surface, the wire 61 is substantially straight and produces no spring force on the roller. However, when the roller is moved onto flat surface 26a, the wire 61 is sprung and produces a spring force holding the roller against the flat surfact and causing the roller to be rotated by the surface (see phantom line position of FIG. 8). When the roller reaches a detent curved surface, the spring force of the rod 61 causes the roller to move into and against the detent surface. The length of the wire 61 between extensions 20a and 20b determines the resistance of the wire to bending at the roller location. The wire should produce enough spring force on the roller to cause it to roll on the flat surface 26a when the handle is rotated. Thus, the development of flat surfaces on the roller can be prevented. On the other hand, the force of the spring wire should not be great enough to cause undue wear and damage to the support structure for the wire. The roller can be fabricated of a plastic material which has some flexibility to permit some curvature during the detent action.

In one form of the invention, the wire 61 is formed from 0.090 inch music wire and the roller is approximately 0.250 inch in diameter, 1.00 inch long and formed of nylon. The distance between the support extensions is approximately two inches so that the ratio of wire to roller length is approximately two to one. Ratios in the range from 1½ to 1 up to 2½ to 1 have been found to work satisfactorily in this form of the invention. If the extensions 20a and 21a were eliminated and wire 61 was supported only at its ends 61a and 62a, the detent mechanism still functions but the spring force would be less than preferred.

It is therefore apparent that the present invention provides a novel adjustable handle for an instrument casing in which the input leads to the instrument can enter through the handle and through a rotating axis of handle out into the instrument casing. Also, the handle can be detented to the fully retracted position, to the fully extended position or to an intermediate position by means of a detent action which permits an extended roller to engage a substantially long curved surface in the rotating section of the handle. Excellent holding action is provided by the use of a spring wire passing through the axis of the roller and suspended at a distance from each end of the roller.

What is claimed is:

1. An adjustable handle for a casing comprising:
   a gripping section movably secured to the casing for supporting the casing and an extension section extending from one end of said gripping section;

a pair of bearing projections extending from opposite sides of said handle extension section;

a pair of spaced walls supported by said casing and having curved surfaces for receiving one side portion of said projections;

a pair of cover caps for securing each of said projections to said casing at the opposite sides of said extension section, each of said caps having a curved surface portion for receiving the other side portion of said projections;

spaced, curved detent surfaces in an external surface of said handle extension section;

a roller located between said walls and movable into engagement with said curved surfaces; and a spring wire extending through said roller and supported by supports attached to said casing;

said spring wire causing said roller to roll on the surface of said extension and to enter one of the curved detent surface in order to hold said handle relative to the casing when the handle is in a selected position.

2. An adjustable handle as define in claim 1:

a depressed space in the bottom of said casing for receiving said handle when in its fully retracted position; and said depressed space having an expanded space portion receiving said handle extension section.

3. An adjustable handle as defined in claim 1 wherein said bearing projections have hollow openings along the axis thereof; and leads passing through said handle and through said openings in said projections into said casing.

4. An adjustable handle as defined in claim 1 wherein:

said supports for said spring wire being spaced on opposite sides of said walls for providing a sufficient length of said wire between said supports to permit depression of the wire and roller when the roller rolls upon said exterior surface of said handle extension section.

5. An adjustable handle as defined in claim 4 wherein:

each of said supports is located between one end of said wire and said roller, the ends of said wire being secured to the casing by said cover caps.

6. An adjustable handle as defined in claim 4 wherein:

said supports for said spring wire are located a distance apart which distance has a ratio to the length of the roller within the range of one and a half to one and two and a half to one.

7. An adjustable handle as defined in claim 6 wherein:

said spring wire at each side of said roller passes through slots in the spaced walls confining said roller.

8. An adjustable handle as defined in claim 1 having:

a bearing cap over each of said bearing projections and attached thereto;

a bearing sleeve around each of said bearing caps having an end flange thereon, each of said flanges being located between one of said walls and a side of said handle extension to position said bearing sleeves and permit said bearing caps to rotate therein.

* * * * *